United States Patent
Hsu

(10) Patent No.: US 9,520,729 B2
(45) Date of Patent: Dec. 13, 2016

(54) CHARGING CONNECTOR OF MOBILE POWER PACK

(71) Applicant: Powergene Technology Co., Ltd., Taiwan Branch, New Taipei (TW)

(72) Inventor: Hui-Te Hsu, New Taipei (TW)

(73) Assignee: POWERGENE TECHNOLOGY CO., LTD., TAIWAN BRANCH, New Taipei (TW)

( * ) Notice: Subject to any disclaimer, the term of this patent is extended or adjusted under 35 U.S.C. 154(b) by 143 days.

(21) Appl. No.: 14/552,467

(22) Filed: Nov. 24, 2014

(65) Prior Publication Data

US 2016/0149425 A1    May 26, 2016

(51) Int. Cl.
*H02J 7/00* (2006.01)

(52) U.S. Cl.
CPC .................... *H02J 7/0042* (2013.01)

(58) Field of Classification Search
CPC ....... Y02E 60/12; H02J 7/0042; H02J 7/0045; H01M 10/46; H01M 10/44
USPC ....................................................... 320/107
See application file for complete search history.

(56) References Cited

U.S. PATENT DOCUMENTS

| | | | | |
|---|---|---|---|---|
| 6,191,552 B1* | 2/2001 | Kates | .................... | H02J 7/0021 307/155 |
| 2006/0170393 A1* | 8/2006 | Yang | .................... | H02J 7/0042 320/107 |
| 2014/0030912 A1* | 1/2014 | Cohen | .................... | H01R 13/73 439/529 |
| 2014/0057487 A1* | 2/2014 | May | ....................... | H01R 13/60 439/530 |

* cited by examiner

*Primary Examiner* — Arun Williams
(74) *Attorney, Agent, or Firm* — Chun-Ming Shih; HDLS IPR Services

(57) ABSTRACT

A charging connector of a mobile power pack, used for being connected to and charging an electronic product, includes an insulating body, a first connector and a second connector both protruding from and exposed outside the insulating body. The first connector is plugged into a charging slot of the electronic product. The second connector is electrically connected to the first connector and is plugged into a power slot of the mobile power pack. The insulating body extends from one side of the first connector and is connected to the second connector. The first connector and the second connector are respectively plugged into the electronic product and the mobile power pack, via the insulating body. Thereby, the convenience of utilizing the power mobile pack to charge the electronic product is improved.

8 Claims, 4 Drawing Sheets

CHARGING CONNECTOR OF MOBILE POWER PACK

TECHNICAL FIELD

The disclosure relates to a charging connector, more particularly to a charging connector of a mobile power pack.

BACKGROUND

With the popularity of wireless communications and wireless networks, smart mobile devices are widely used in daily life. These smart mobile devices consume a large amount of power so people carry mobile power pack to charge these devices at any time. The mobile power pack is a portable charger which is rechargeable and can supply power. Generally speaking, the mobile power pack uses lithium batteries and is safe, small, multifunctional and reliable. Besides, it can provide a large amount of power.

Currently the mobile power pack charges the electronic product via a USB charging cable. A plug connector on one end of the USB charging cable is plugged into the electronic product while another plug connector on the other end of the USB charging cable is plugged into the mobile power pack. Thereby, power stored in the mobile power pack can be transmitted to the electronic product via the USB connector.

Since the USB charging cable is relatively long, it is troublesome for users to sort it while the mobile power pack is charging the electronic product. Moreover, the USB charging cable in a backpack or a handbag may cause problems because it is susceptible to be pulled off, which may interrupt the charging process. This is very confusing and inconvenient.

The objective of the disclosure is to provide an improved charging connector capable of solving the problems mentioned above.

SUMMARY

One goal of the disclosure is to provide a charging connector of a mobile power pack which omits the connection cable. The charging connector of the mobile power pack is compact and easy to carry around, which enables the mobile power pack to charge the electronic product conveniently.

Another goal of the disclosure is to provide a charging connector of a mobile power pack which includes a cover for protecting the charging connector when it is not being used.

To reach these goals, a charging connector of a mobile power pack configured for being connected to and charging an electronic product is provided. The charging connector of a mobile power pack comprises an insulating body, a first connector and a second connector both protruding from and exposed outside the insulating body. The first connector is plugged into a charging slot of the electronic product. The second connector is electrically connected to the first connector and is plugged into a power slot of the mobile power pack. The insulating body extends from one side of the first connector and is connected to the second connector. The first connector and the second connector are respectively plugged into the electronic product and the mobile power pack, via the insulating body. Thereby, the convenience of the power mobile pack charging the electronic product is improved.

Compared to Prior Art, the charging connector of the mobile power pack includes two connectors disposed on the insulating body. These two connectors correspond to the two charging slots of the mobile power pack and the electronic product. In the charging connector of the disclosure, the mobile power pack is capable of charging the electronic product stacked thereon so the USB charging cable is not needed. Additionally, the charging connector of the disclosure is small and easy to carry. Moreover, the charging connector may further comprise a cover which may be reversely clasped to the charging connector to avoid being lost during the charging process. On the other hand, the cover can protect the charging connector because it may be fitted on the charging connector while the charging connector is not being used. This further improves the practicality.

BRIEF DESCRIPTION OF THE DRAWINGS

The disclosure will become more fully understood from the detailed description and the drawings given herein below for illustration only, and thus does not limit the present disclosure, wherein.

DETAILED DESCRIPTION

Figure 1:
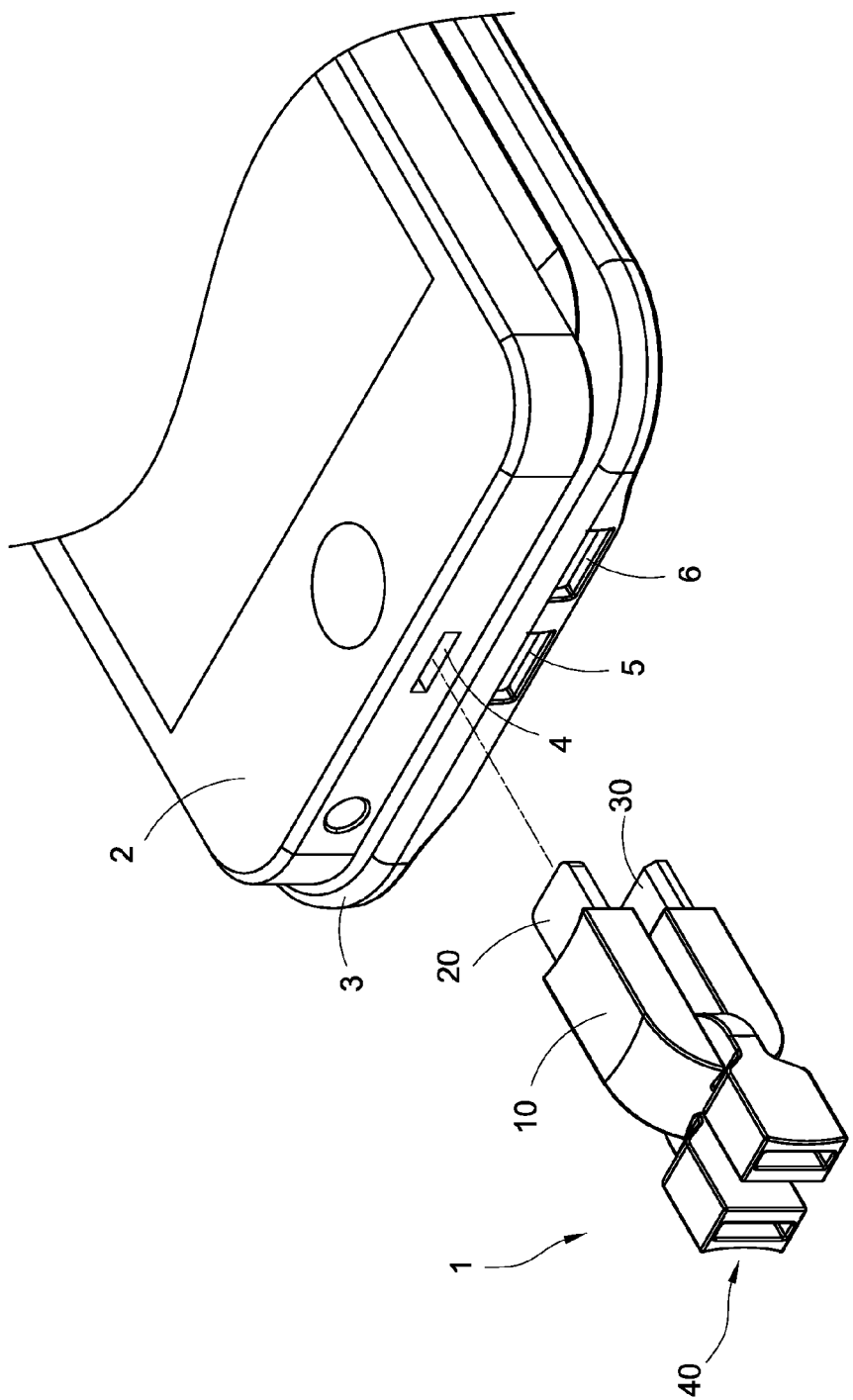
FIG. 1 is a schematic view of the usage of a charging connector of a mobile power pack according to an embodiment of the disclosure.
Figure 2:
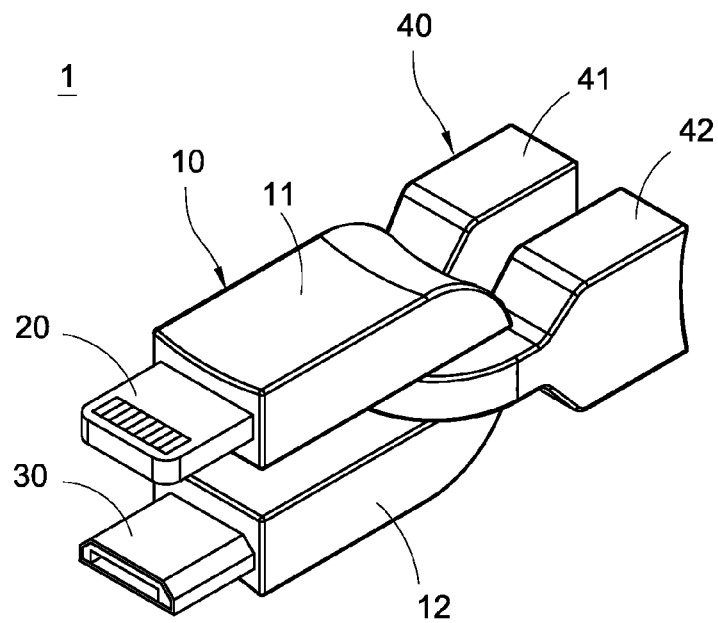
FIG. 2 is a perspective view of the charging connector of the mobile power pack according to the embodiment of the disclosure.
Figure 3:
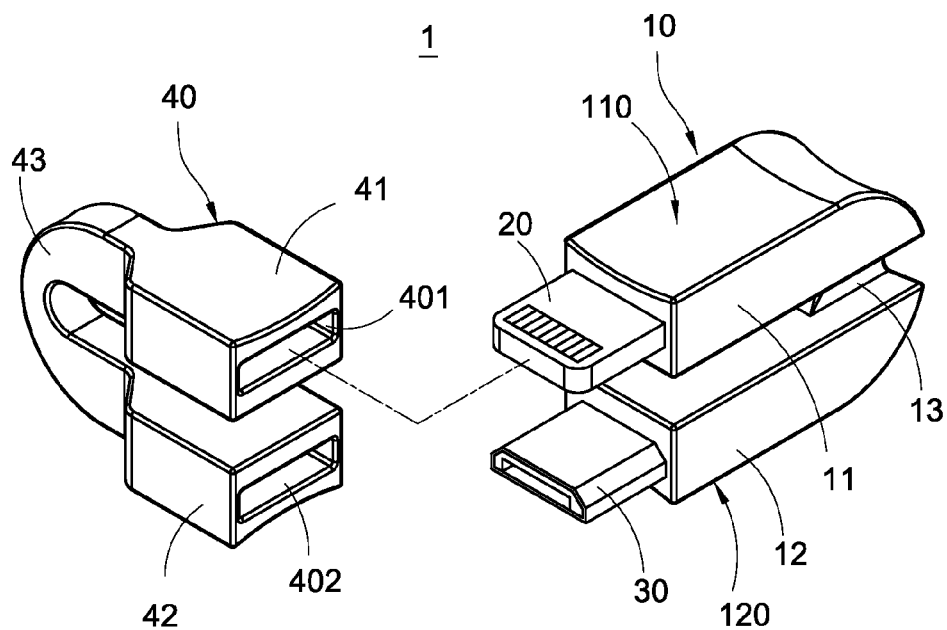
FIG. 3 is a perspective view of the charging connector of the mobile power pack and a cover plugged therein according to the embodiment of the disclosure.
Figure 4:
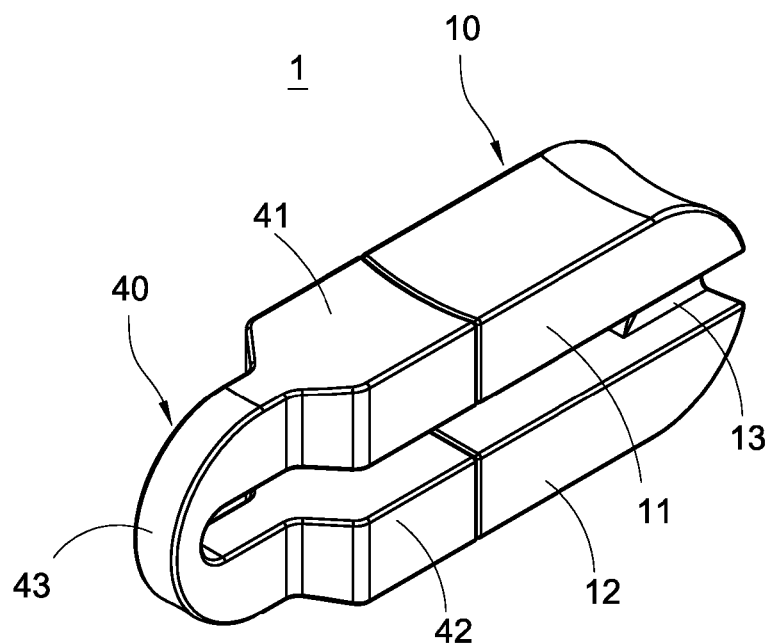
FIG. 4 is a perspective view of the assembly of the charging connector of the mobile power pack and the cover according to the embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As seen in FIG. 1 to FIG. 4, a charging connector 1 of a mobile power pack is for being connected to an electronic product 2 (in this embodiment, the electronic product 2 is a mobile phone but it is not limited thereto), and the mobile power pack 3 is capable of charging the electronic product 2 via the charging connector 1. The charging connector 1 comprises an insulating body 10, a first connector 20 and a second connector 30. Practically, the charging connector 1 may further comprise a cover 40. When using the charging connector 1, the cover 40 may be reversely clasped to the charging connector 1 to avoid losing it. On the other hand, the cover 40 may be fitted on the charging connector 1 when not using the charging connector 1, thereby protecting the first connector 20 and the second connector 30.

The first connector 20 protrudes from and is exposed outside the insulating body 10. The first connector 20 is used for being plugged into a charging slot 4 of the electronic product 2. Furthermore, the second connector 30 protrudes from and is exposed outside the insulating body 10 and is electrically connected to the first connector 20. The second connector 30 is used for being plugged into a power slot 5 of the mobile power pack 3. Specifically, the insulating body 10 extends from one side of the first connector 20 and is connected to the second connector 30. The first connector 20 and the second connector 30 are respectively plugged into the electronic product 2 and the mobile power pack 3 via the insulating body 10.

In this embodiment, the electronic product 2 and the mobile power pack 3 are stacked up. The first connector 20 and the second connector 30 are on the same side along with the insulating body 10 while the first connector 20 and the second connector 30 are parallel to each other. However, the disclosure is not limited thereto. Also noteworthy is that the mobile power pack 3 of this embodiment still has a USB slot 6 for the normal USB charging cable to be plugged in.

In one embodiment, the insulating body 10 is roughly U-shaped. The insulating body 10 comprises a first plugging section 11, a second plugging section 12 parallel to and spaced apart from one side of the first plugging section 11 and a bending section 13 connecting the first plugging section 11 and the second plugging section 12. The first connector 20 is connected to the insulating body 10. Additionally, the first connector 20 protrudes from the first plugging section 11 and is exposed. On the other hand, the second connector 30 is connected to the insulating body 10. The second connector 30 protrudes from the second plugging section 12 and is exposed.

Preferably, the first plugging section 11 and the second plugging section 12 have concave surfaces 110 and 120 respectively. The arrangement of the concave surfaces 110 and 120 makes users hold the charging connector 1 more conveniently, thereby facilitating the assembly and disassembly between the electronic product 2 and the mobile power pack 3. Moreover, the bending section 13 is preferably to be a necking section. The lateral side of the bending section 13 shrinks by a distance relative to the lateral sides of the first plugging section 11 and the second plugging section 12.

In this embodiment, the first connector 20 is a lightning connector (a proprietary connector created by Apple Inc.) while the second connector 30 is a Micro USB connector. However, the disclosure is not limited thereto. The specifications of the first connector 20 and the second connector 30 may be adjusted based on the types of the charging slot 4 of the electronic product 2 and the power slot 5 of the mobile power pack 3.

The cover 40 is an insulating base. A first slot 401 for the first connector 20 to be plugged in and a second slot 402 for the second connector 30 to be plugged in are disposed on the cover 40. In this embodiment, the cover 40 comprises a first casing 41, a second casing 42 parallel to and spaced apart from one side of the first casing 41 and a link section 43 connecting the first casing 41 and the second casing 42. The first slot 401 extends inwardly from one end of the first casing 41 while the second slot 402 extends inwardly from one end of the second casing 42.

In an embodiment, the link section 43 is U-shaped and the cover 40 can be reversely clasped to the charging connector 1. The link section 43 may be disposed between the first plugging section 11 and the second plugging section 12 of the insulating body 10. Furthermore, the link section 43 may clasp to the bending section 13 tightly because the bending section 13 is a necking section.

Figure 5:
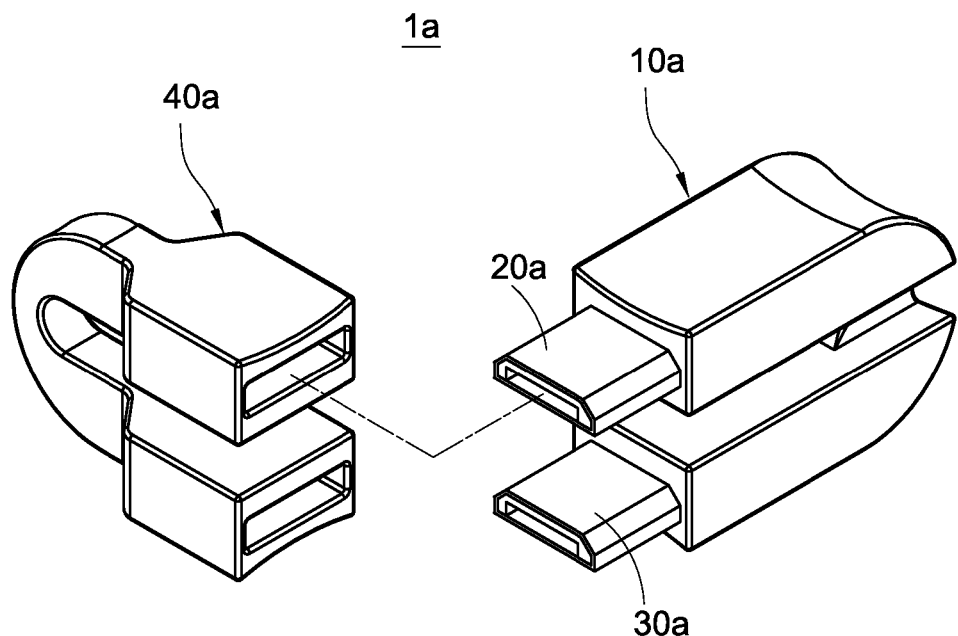
FIG. 5 is a perspective view of a charging connector of a mobile power pack according to another embodiment of the disclosure.

FIG. 5 is a perspective view of a charging connector of a mobile power pack according to another embodiment of the disclosure. Referring to FIG. 5, the charging connector 1a of this embodiment comprises an insulating body 10a, a first connector 20a and a second connector 30a and a cover 40a. The specifications of the first connector 20a and the second connector 30a differ from those of the first embodiment. In this embodiment, the first connector 20a and the second connector 30a both are a Micro USB connector.

Figure 6:
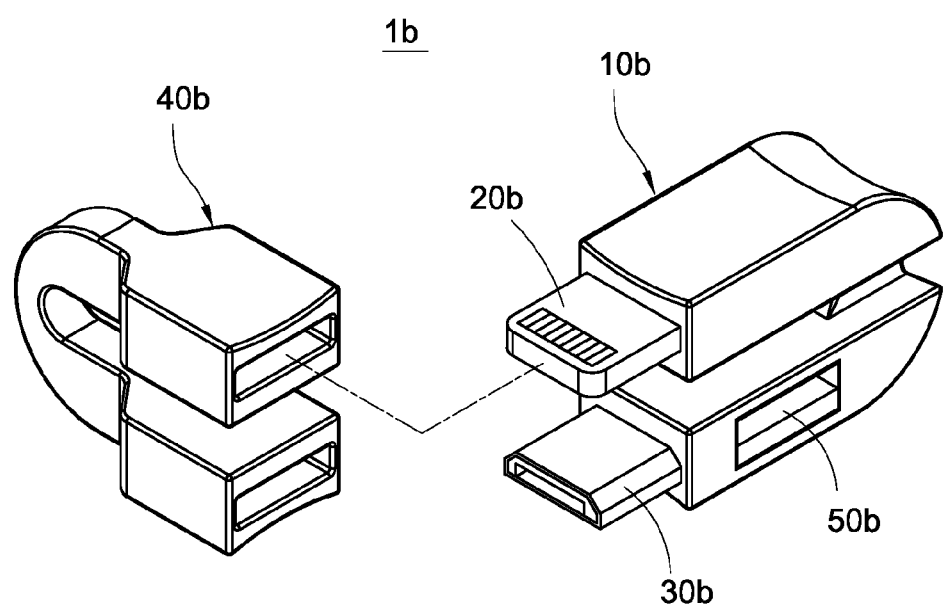
FIG. 6 is a perspective view of a charging connector of a mobile power pack according to still another embodiment of the disclosure.

FIG. 6 is a perspective view of a charging connector of a mobile power pack according to still another embodiment of the disclosure. As seen in FIG. 6, the charging connector 1b of this embodiment comprises an insulating body 10b, a first connector 20b and a second connector 30b and a cover 40b. By comparison, the charging connector 1b further comprises a power socket 50b disposed on the insulating body 10b and electrically connected to the first connector 20b and the second connector 30b. By setting the power socket 50b, a power cable (not shown in the figures) connected to the mains may be plugged in the power socket 50b so that the user is able to charge the electronic product and the mobile power back simultaneously. This improves the convenience of overall operation processes.

What is claimed is:

1. A charging connector of a mobile power pack, configured for being connected to and charging an electronic product, comprising:
an insulating body including a first rigid plugging section, a second rigid plugging section parallel to and spaced apart from the first plugging section, and a rigid bending section directly connecting in between the first plugging section and the second plugging section;
a first connector including a first contact portion directly protruding from and exposed outside the first rigid plugging section, wherein the first connector is plugged into a charging slot of the electronic product by inserting the first contact portion inside the charging slot;
a second connector including a second contact portion directly protruding from and exposed outside the second rigid plugging section, wherein the second connector is electrically connected to the first connector and is plugged into a power slot of the mobile power pack by inserting the second contact portion inside the charging slot;
wherein the insulating body extends from one side of the first connector and is connected to the second connector, the first connector and the second connector are respectively plugged into the electronic product and the mobile power pack, via the insulating body.

2. The charging connector of the mobile power pack according to claim 1, wherein the first plugging section and the second plugging section both have a concave surface.

3. The charging connector of the mobile power pack according to claim 1, wherein the rigid bending section is a necking section, the lateral side of the rigid bending section shrinks by a distance relative to the lateral sides of the first rigid plugging section and the second rigid plugging section.

4. The charging connector of the mobile power pack according to claim 1, wherein the first connector is a lightning connector while the second connector is a Micro USB connector.

5. The charging connector of the mobile power pack according to claim 1, wherein the first connector and the second connector both are a Micro USB connector.

6. The charging connector of the mobile power pack according to claim 1, further comprising a cover, wherein the cover comprises an insulating base, and a first slot for the first connector to be plugged into and a second slot for the second connector to be plugged into are disposed on the insulating base; wherein the insulating base comprises a first casing, a second casing parallel to and spaced apart from one side of the first casing and a rigid link section connecting the first casing and the second casing, the first slot extends inwardly from one end of the first casing while the second slot extends inwardly from one end of the second casing; wherein the rigid link section is U-shaped and is configured for being disposed between the first plugging section and the second plugging section and being clasped to the rigid bending section tightly when the first connector and the second connector are respectively plugged into the electronic product and the mobile power pack, via the insulating body.

7. The charging connector of the mobile power pack according to claim 1, further comprising a power socket disposed on the insulating base and electrically connected to the first connector and the second connector.

8. The charging connector of the mobile power pack according to claim 1, wherein the mobile power pack and the electronic product are stacked up, the first connector and second connector are on the same side along with the insulating body and are parallel to each other.

* * * * *